(12) United States Patent
Fourre et al.

(10) Patent No.: US 10,248,833 B2
(45) Date of Patent: Apr. 2, 2019

(54) METHOD FOR BIOMETRIC PROCESSING OF IMAGES

(71) Applicant: Safran Identity & Security, Issy-les-Moulineaux (FR)

(72) Inventors: Joel-Yann Fourre, Issy-les-Moulineaux (FR); Alain Thiebot, Issy-les-Moulineaux (FR); Florence Guillemot, Issy-les-Moulineaux (FR); Remy Chiu, Issy-les-Moulineaux (FR); Benjamin Peyronneaud, Issy-les-Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 67 days.

(21) Appl. No.: 15/428,041

(22) Filed: Feb. 8, 2017

(65) Prior Publication Data

US 2017/0228577 A1 Aug. 10, 2017

(30) Foreign Application Priority Data

Feb. 9, 2016 (FR) ..................................... 16 51010

(51) Int. Cl.
*G06K 9/00* (2006.01)

(52) U.S. Cl.
CPC ......... *G06K 9/0008* (2013.01); *G06K 9/0004* (2013.01)

(58) Field of Classification Search
USPC .................................. 340/5.52; 382/115, 124
See application file for complete search history.

(56) References Cited

U.S. PATENT DOCUMENTS

| 8,508,337 | B2* | 8/2013 | Thiebot ............... G06K 9/2018 340/5.52 |
| 9,659,362 | B2* | 5/2017 | Klimovski ............. G06T 7/001 |
| 9,892,306 | B2† | 2/2018 | Hillmann |
| 9,898,646 | B2* | 2/2018 | Besson ............. G06K 9/00906 |

(Continued)

FOREIGN PATENT DOCUMENTS

| EP | 1 318 473 A2 | 6/2003 |
| EP | 2 919 157 A1 | 9/2015 |
| WO | WO 2013/071311 A1 | 5/2013 |

OTHER PUBLICATIONS

Search Report in French Application No. 1651010 dated Oct. 3, 2016, with English translation coversheet. 3 pages.

*Primary Examiner* — Xuemei G Chen
(74) *Attorney, Agent, or Firm* — Womble Bond Dickinson (US) LLP

(57) ABSTRACT

The invention relates to a method for biometric processing of images of part of the human body comprising at least one finger, said method being performed by a sensor, and wherein an emissive screen (1) displays at least one first display pattern to light said part of the human body and an imager (2) acquires at least one first image of said part of the human body; from this first image, the automated data-processing system determines at least one second display pattern different to the first display pattern; the emissive screen (1) displays at least the second pattern to light said part of the human body and the imager (2) acquires at least one second image of said part of the human body; a biometric processing being performed on a final image constructed from at least the second image.

11 Claims, 6 Drawing Sheets

(56) References Cited

U.S. PATENT DOCUMENTS

| | | | |
|---|---|---|---|
| 2003/0147550 A1* | 8/2003 | Shigeta | G06K 9/00013 382/124 |
| 2004/0252867 A1 | 12/2004 | Lan et al. | |
| 2015/0252980 A1* | 9/2015 | Maeda | G06K 9/00013 382/115 |
| 2017/0140565 A1* | 5/2017 | Thuillier | G06T 11/60 |
| 2017/0206397 A1* | 7/2017 | Picard | G06K 9/0012 |
| 2017/0337414 A1* | 11/2017 | Ohno | G06K 9/0012 |

\* cited by examiner
† cited by third party

FIG 6a
FIG 6b
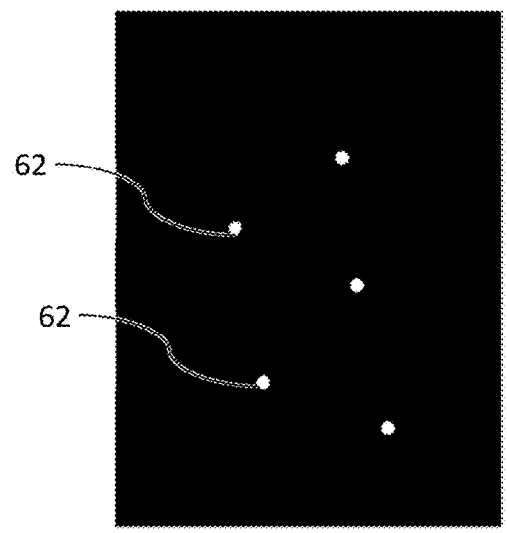
FIG 6c
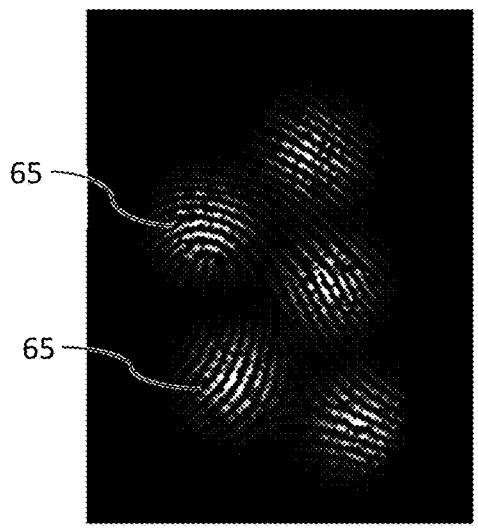

METHOD FOR BIOMETRIC PROCESSING OF IMAGES

The present invention relates to a method for biometric processing of images of part of the human body having papillary ridges, and to a fingerprint sensor executing said method.

Identification by papillary prints is one of the techniques most used in biometry. Papillary prints are formed by papillary ridges present on the epidermis at the surface of the skin. These papillary ridges, also called dermatoglyphs, are the exact projection of the design present at depth on the dermis. Papillary ridges have the advantage of being individual, immutable, and invariable, except for profound alteration of the dermis.

Those parts of the human body having papillary prints mainly comprise fingers, especially fingerprints, but also palms or the sole of the feet. Several technologies are able to acquire papillary prints for identification purposes. Acquisition of an optical image of fingerprints of a finger is the most widely used and will be used to illustrate the present invention. Finger will therefore be used hereinbelow to designate that part of the human body having papillary prints, and fingerprints for designate papillary prints.

However, current technologies for acquiring papillary prints, such as total internal reflection technology, are very bulky, especially when linked to use of a prism and optics to form the image, which led to the use of capacitive or thermal technologies for sensors on-board portable terminals such as computers or mobile telephones, the performance of which however is clearly inferior. These capacitive or thermal sensors can be made by microelectronics methods on silicon or on glass and allow minimum thickness.

To reduce the bulk of sensors, flat optical sensors have been developed, by which an image of an illuminated finger is acquired and analyzed to identify an individual. These flat optical sensors generally comprise elements sensitive to light constituting an imager arranged on a substrate by microelectronics or printed electronics methods. The substrate can be made of silicon or advantageously glass or plastic. In this case, TFT (thin film transistor) or OTFT (organic thin film transistor) technologies will be used to make an active matrix. These optical sensors need a source of light.

A possible and advantageous arrangement consists of placing a source of diffuse light illuminating the field of acquisition of the optical imager. The source of diffuse light can be placed behind the sensor, and for example can be a flat emitting screen in LCD or OLED technology. The light passes through the substrate of the sensor to light the finger(s). The sensitive elements of the sensor are made so as not to be sensitive to light coming from the rear face. This is usually done by an opaque metallic deposit below the sensitive element and advantageously constituting the lower electrode of the latter. When at least one finger is placed in contact with the sensor, the light backscattered by the latter reaches the sensitive elements and allows forming an image. The quantity of light backscattered differs significantly when the finger is in contact with the sensor (case of a ridge) or is not (case of a valley). This arrangement produces an image of the fingerprints of the finger placed in contact with the sensor.

The source of light can also be placed in the same plane as the sensor, for example by interposing on the same substrate the sensitive elements of the sensor and the light-emitting elements of the source of diffuse light.

However, several factors can degrade the quality of the image of the fingerprints acquired in this way. The quality of an image of fingerprints acquired with an optical sensor depends on the pressure exerted by the finger on the surface of the sensor, on the moisture of the finger, and above all on the external light, i.e., lighting other than that emitted by the sensor, typically the sun or artificial lighting in the environment.

FIG. 1 illustrates the effects of different lighting conditions when the external light is strong in intensity on the images of fingerprints in the prior art, with a source of uniform diffuse lighting.

In the image to the left, the intensity of the light source of the sensor is regulated to correctly image the center 101 of the finger. The consequence of strong external light is that the periphery of the part of the finger in contact with the sensor is not imaged due to saturation by overexposure of the edges of the finger, shown in the image acquired by the sensor by a white zone 102. In the image to the right, the intensity of the light source of the sensor is regulated to correctly image the edges 103 of the finger, and a dark zone 104 is seen by underexposure of the center of the finger.

Both the white zone 102 and the dark zone 103 correspond to zones whereof it is not possible to distinguish with sufficient reliability the exploitable characteristics of the fingerprints (minutiae). Ambient light can therefore lead to a loss of information on the finger, and therefore to the impossibility of executing a biometric method on the acquired image, or to a lesser reliability of the latter.

Several solutions have been proposed to improve the robustness of a fingerprint sensor to external light, but these have several disadvantages, for example a consequent extra cost or incompatibility with a flat sensor of minimum bulk. For example, WO 2013/071311 proposes reducing the intensity of ambient light by a structure of layers blocking the latter. FR2757974 and FR2757975 propose acquiring an image of the finger lit by the light source of the sensor and of the finger lit only by the external light to eliminate external light by subtraction. This solution is however sensitive to movement of the finger between the acquisitions of the two images. Also, it does not correctly find the information if one of the images is saturated. US 2004/0252867 proposes using a green filter to profit from the fact that minimum green light passes through a finger. Much spectral information is lost, however, which can be useful for validating the authenticity of a finger. Making such a filter also heightens the difficulty of production of the sensor as this filter must be robust, thin, and have a performance maintained even for beams of very oblique incidence.

In fact, it is possible to use frauds, false fingers reproducing characteristics forming the basis for analysis of the image, such as for example fingerprints. These can for example be made by molding a finger in silicone or in any flexible material.

It is therefore necessary to ensure that biometric processing validates that the analyzed object is an authentic element of a human body, and not fraud or a decoy. Several possibilities have been explored to this end, such as the use of electric or ultrasonic measurements. For example, patent FR2849244 proposes using transparent electrodes added to the surface of an optical sensor to make an impedance measurement in addition to acquisition by the sensor of the image of the fingerprints. This presents the default of adding extra steps of a manufacturing process to the surface of the sensor which can in some cases be technically difficult to execute if the layers constituting the sensor are fragile as during use of organic elements. These electrodes must also resist repeated contacts by fingers and can present problems of reliability if they are abraded. This also adds costs in terms of manufacturing and electronics for measuring impedance. Also, for a sensor having a large surface, for example provided for at least four fingers or for the palm, the number of electrodes has to be multiplied, complicating control electronics and slows acquisition if impedances representative of the entire surface in contact with the sensor must be measured.

However, it is preferable to be able to detect frauds by means of the image acquired by the imager. It is not necessary to provide extra elements such as instruments for measuring impedance. This detection can be performed in an existing sensor without having to modify the latter.

Of those validation solutions based on optics, the application FR3015728 proposes a method for validating the authenticity of a finger based on the absorption and scattering of light in several colors. However, this method requires that the finger to be analyzed covers a predetermined field of emission of the light sources, which poses no problem for a small-sized sensor intended to acquire only the image of a single finger at a predetermined position. However, this poses a problem in the case of a large-sized sensor, where the position of the finger(s) cannot be predetermined.

Also, in the majority of sensors detecting fraud by means of particular illumination of the finger, a unique pattern of predetermined lighting is used. For example, a matrix of light-emitting diodes projects onto the finger a pattern dictated by the distribution of said light-emitting diodes. The location determinist of the source of lighting and therefore of the zone of analysis can constitute a flaw for fraud detection.

It can be provided to illuminate the finger by means of two predetermined lighting patterns, but rarely more, for example by lighting up only some of the light-emitting diodes each time. Accordingly, the capacities of a matrix of light-emitting diodes in terms of number of possible patterns are limited by bulk and the cost. This makes it difficult to produce complicated shapes. Also, it is not easy to superpose patterns of different colors as they are projected by different light-emitting diodes.

PRESENTATION OF THE INVENTION

The aim of the invention is to rectify these disadvantages at least in part, and propose a method for acquiring an image of good-quality papillary prints and enabling fraud detection.

For this reason, a method for biometric processing of images of part of the human body having papillary ridges is proposed, said method being performed by a sensor comprising:
- an automated data-processing system,
- an emissive screen comprising an array of individually controllable pixels, the state of the pixels defining a display pattern of the emissive screen,
- a substrate on which are disposed elements sensitive to light constituting an imager and sharing the orientation of the emissive screen, said sensor comprising a surface adapted to receive in contact a part of the human body to be imaged, said emissive screen being configured to light said part of the human body to be imaged when said part of the human body is in contact with the surface, said method comprising the steps according to which, to acquire images of part of the human body having papillary ridges on contact with the surface:

the emissive screen displays at least one first display pattern to light said part of the human body and the imager acquires at least one first image of said part of the human body, from this first image, the automated data-processing system determines at least one second display pattern different to the first display pattern, the determination of the second pattern comprises analysis of the first image to locate a representation of the part of the human body in said first image, and determination of the second pattern comprises positioning of lighting zones in the second pattern corresponding to the location of the representation of the part of the human body in the first image, such that the part of the human body in contact with the surface is lit by said lighting zones when the emissive screen displays the second pattern, the second pattern comprising luminous geometric figures which are distinct and separate, the emissive screen displays at least the second pattern to light said part of the human body so that said part of the human body contacting the surface is lit by said lighting zones when the emissive screen displays the second pattern, and the imager acquires at least one second image of said part of the human body, biometric processing being performed on a final image constructed from at least the second image, said biometric processing comprising performing a method for fraud detection aimed at determining that the imaged part of the human body is authentic and not a fraud using the luminous geometric figures.

The method has many advantages. The second pattern being determined from the first image, it can be specially adapted to the specificities identified by the latter, whether in terms of conditions of acquisitions (lighting, positioning, . . . ) or in terms of finalities to be achieved (identification, fraud detection, etc . . . ). So, the second image can have an augmented quality relative to the first image, for example in terms of homogeneity of light intensity, contrast, or can have characteristics specific to conducting dedicated steps, such as a fraud detection step by means of carefully placed luminous figures. Also, the method can be reiterated several times.

The method is advantageously completed by the following characteristics, taken singly or in any of their technically possible combinations:
- biometric processing of the second image comprises a step for detecting, among the pixels of said second image, the pixels corresponding to papillary ridges;
- determination of the second pattern comprises determination of the spatial distribution of the light intensity in the first image, and the second pattern is determined from the inverse of said spatial distribution;
- biometric processing comprises analysis in the final image of the decrease in light intensity from sites of the second image corresponding to the projections of said geometric figures on the part of the human body lit by the second pattern displayed by the emissive screen;
- determination of the second pattern comprises analysis of the first image to locate the at least partial representation of the part of the human body in the first image, and the geometric figures of the second pattern are located in the second display pattern at a zone corresponding to said representation of the part of the human body in the first image, such that the geometric figures are displayed by the emissive screen facing the part of the human body;

analysis of the first image comprises location in the representation of the part of the human body in the first image of a region representative of a particular visual feature of said part of the human body, and the zone in which are located the geometric figures of the second pattern corresponds to said region representative of a particular visual feature of said part of the human body, such that the geometric figures are displayed by the emissive screen facing said region representative of a particular visual feature of said part of the human body;

the geometric figures of the second pattern are spaced apart by at least 2 mm and are arranged randomly;

several second display patterns are determined from the first image, and, successively for at least several of said second display patterns, the emissive screen displays at least one of said second patterns to light said part of the human body and the imager acquires at least one second image of said part of the human body.

at least one of said second patterns is constituted by colors in wavelengths less than 600 nm and another of said second patterns is constituted by colors in wavelengths greater than 600 nm.

The invention also relates to a sensor comprising:

an automated data-processing system, an emissive screen comprising an array of individually controllable pixels, the state of the pixels defining a display pattern of the emissive screen, a substrate on which are disposed elements sensitive to light constituting an imager and sharing the orientation of the emissive screen, said sensor comprising a surface adapted to receive in contact a part of the human body to be imaged, said emissive screen being configured to light said part of the human body to be imaged when said part of the human body is in contact with the surface, said sensor being configured to perform the method according to the invention, wherein to acquire images of a part of the human body having papillary ridges in contact with the surface:

the emissive screen displays at least one first display pattern to light said part of the human body and the imager acquires at least one first image of said part of the human body, from this first image, the automated data-processing system determines at least one second display pattern different to the first pattern, the determination of the second pattern comprises analysis of the first image to locate a representation of the part of the human body in said first image, and determination of the second pattern comprises positioning of lighting zones in the second pattern corresponding to the location of the representation of the part of the human body in the first image, such that the part of the human body in contact with the surface is lit by said lighting zones when the emissive screen displays the second pattern, the second pattern comprising luminous geometric figures which are distinct and separate, the emissive screen displays at least the second pattern to light said part of the human body so that said part of the human body contacting the surface is lit by said lighting zones when the emissive screen displays the second pattern, and the imager acquires at least one second image of said part of the human body.

The invention also relates to a computer program product comprising program code instructions for executing the steps of the method according to one of the embodiments of the invention when said program is executed by a computer.

Preferably, the computer program product takes the form of a non-volatile memory readable by computer, such as an optical disc, a hard drive or a semi-conductor memory known as "flash memory".

PRESENTATION OF THE FIGURES

The invention will be more clearly understood by way of the following description which relates to embodiments and variants according to the present invention, given by way of non-limiting examples and explained with reference to the appended schematic drawings, wherein:

FIG. 1, already commented on, illustrates two examples of images of fingerprints acquired by a biometric sensor performing a method according to the prior art;

FIGS. 6a, 6b and 6c illustrate an example of implementation of the embodiment of FIG. 4;

DETAILED DESCRIPTION

A sensor used by the method of the invention is a flat optical sensor comprising elements sensitive to light constituting an imager. These sensitive elements can be made on a substrate by TFT technologies, for example on glass and OTFT, for example on plastic. Advantageously, the substrate can be transparent and the sensor insensitive to light coming from the rear face. These optical sensors need a source of light. A possible and advantageous arrangement consists of placing a source of light to the rear of the sensor, for example an emitting flat screen in LCD or OLED technology. Another solution is to make on the substrate itself of the sensor emitting elements of OLED type. TFT or OTFT technologies can be used, and a substrate made of glass or plastic.

Figure 2:
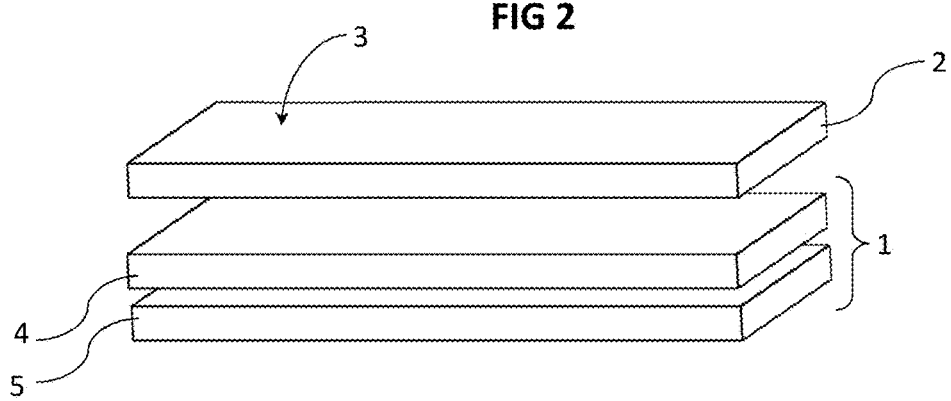
FIG. 2 illustrates schematically the structure of a biometric sensor adapted to perform the invention.

In reference to FIG. 2, an example of a sensor adapted to perform the method for biometric processing comprises an emissive screen 1 and an imager 2 constituted by a substrate on which are disposed elements sensitive to light. The emissive screen 1 and the imager 2 share the same orientation: the emissive screen 1 is configured to illuminate the field of acquisition of the imager 2. The emissive screen 1 and the imager 2 can be superposed or coplanar. The sensor comprises a surface 3 adapted to receive in contact a part of the human body to be imaged. The emissive screen 1 is configured to light the part of the human body when it is in contact with the surface 3. The emissive screen comprises a matrix of individually controllable pixels 4. The state of the pixels of the matrix 4 defines the display pattern of the emissive screen.

Display pattern means the assembly formed by the light characteristics of the display, in terms of light intensity, distribution, luminous form, position, color . . . . In this way, two display patterns can differ for example by the image displayed, the intensity and/or color.

Those elements sensitive to light of the imager 2 are made so that they are not sensitive to light coming directly from the screen. This can be made possible by using the lower electrode made with metal as a light screen. Other opaque deposits can be used optionally under the sensitive element. Spaces where there is no opaque deposit are made between the sensitive elements to let a portion of the light emitted by the screen pass through the sensor. This portion can be between 2 and 50%. In the event where the OLEDs are made on the same substrate as the elements sensitive to light, there is no more restriction in particular transparency of the substrate. Functions of adapted baffling must be realized however, i.e., optical protection, so that the sensitive elements are not dazzled by the light coming directly from the emitting elements.

In the example illustrated by FIG. 2, the emissive screen 1 comprises a pixel matrix 4 and a backlighting member 5 arranged behind the pixel matrix 4. Behind the side opposite the direction in which the surface 3 is located is also the direction of lighting of the emissive screen 1. This is for example a configuration of a screen of liquid crystal or OLED type. The substrate on which are disposed the elements sensitive to light forming the imager 2 is above the emissive screen 1 here. The substrate is then transparent to let light emitted by the emissive screen 1 pass through. The surface 3 is then the surface of the imager 2.

Other configurations are possible, with for example an emissive screen 1 comprising a matrix of organic light-emitting diodes emitting light, which can be arranged above (i.e. in the direction of lighting) of the imager 2. In this case, the surface 3 is that of the emissive screen 1. It is not necessary for the substrate of the imager 2 to be transparent. Preferably, the OLED screen must have both a characteristic of transparency (it lets at least 2% of light arriving from above to the sensor to pass through) and emission of light solely towards the upper can be used above the sensor. It is also possible to ensure that the emissive screen 1 is in the same plane as the imager 2 by interposing the sensitive elements of the imager 2 and the light-emitting elements of the emissive screen 1.

The sensitive elements are for example made on a substrate of glass and consist of photo detectors, for example PIN photodiodes made from silicon, organic photodiodes, or else any other element sensitive to light. The substrate could also be plastic, or any other adequate material, for connecting to an emissive screen.

As for the emissive screen whereof the pixels are individually addressable in line and column to control their state, and therefore the display pattern, the sensitive elements form addressable pixels, which can be read especially. Conventionally, each pixel comprises a selection transistor, and they are organized in line and columns. The commands of selection transistors are common on a line, and reading levels of pixels is done in columns. The selection or addressing transistors are for example thin-film transistors (TFT).

Preferably, the electronics of the addressing in line of the sensitive elements is made on the substrate fully or partly, especially to limit the number of connections of the substrate and therefore the cost of the system, or to achieve higher resolutions. In the case of a substrate made of glass, integration of the electronics required for addressing is favored by use of poly-Si TFT technology or the solutions of transistors in oxide (indium gallium zinc oxide IGZO for example). TFT solutions made of amorphous silicon disallow such complete integration of addressing electronics, but do however produce pixels. OTFT solutions (organic transistor on glass or more often plastic) also produce such a sensor.

The pixels of the emissive screen 1 and the pixels of the imager 2 may not have the same distribution, and in particular may not have the same density. Therefore, the emissive screen can have a density of emitting elements different to the density of the sensitive elements of the imager, for example lower or higher. Also, the surface of the emissive screen 1 can be different to the surface of the imager 2, and can advantageously be larger.

The sensor can also comprise an automated data-processing system comprising one or more processing, memory, software, data, input-output members and linking units, especially for controlling the display of the emissive screen 1, image acquisition by the imager 2, and processing of images acquired by said imager 2. The automated data-processing system can also be outside the sensor, and for example can be a computer communicating with the sensor.

The sensor is configured to perform a method for biometric processing of images of part of the human body having papillary ridges, wherein images of the part of the human body are acquired by the sensor. More precisely, the method comprises the steps according to which, to acquire images of part of the human body having papillary ridges on contact with the surface:

the screen displays at least one first display pattern to light said part of the human body and the imager acquires at least one first image of said part of the human body, from this first image, the automated data-processing system determines at least one second display pattern different to the first pattern, the screen displays at least the second pattern to light said part of the human body and the imager acquires at least one second image of said part of the human body.

Display of the First Pattern

In a typical configuration, the first pattern displayed by the emissive screen 1 is a predetermined pattern, independent of the characteristics of the part of the human body in contact with the surface 3, and in particular its arrangement. For example, with no other image of the part of the human body having been acquired earlier, the sensor therefore has no information on the latter, and the first display pattern is therefore a generic display pattern. In the simplest case, the first display pattern is for example a uniform pattern, allowing diffuse lighting of the part of the human body in contact with the surface 3. The first display pattern can also propose indications for the person who must rest his fingers on the surface 3, for example marking indicating the expected position of the fingers, or instructions. Preferably however, the first display pattern is devoid of extensive dark zones.

Acquisition of the First Image

The part of the human body in contact with the surface 3 being lit by the display of the first display pattern, the imager 2 acquires at least one first image of said part of the human body. More precisely, light backscattered by the part of the human body arrives at the imager 2 which therefore acquires an image of the light sent back by said part of the human body. Several images can be acquired, especially by changing a first display pattern, and the first image can be selected from the latter or else constructed from the latter, for example by combination of the images acquired. Several first display patterns of different colors and/or different intensities can be used for example.

Determination of the Second Pattern

For acquiring a second image, the screen 1 displays a second pattern, different to the first pattern. This second pattern depends on the first image: the second pattern is determined from the first image by the automated data-processing system, which therefore conducts analysis of said first image.

Analysis of the first image can be done to locate the representation of the part of the human body in said first image. Analysis of the first image can comprise identification of zones of interest.

In particular, analysis of the first image can comprise identification of the ridges and valleys representative of a fingerprint, and the classification of pixels of the first image as a function of this identification. The identification of ridges and valleys can be made by binarization of the first image, i.e., amplification of the differences in characteristics between pixels divided into two classes: those having characteristics specific to ridges and those having characteristics specific to valleys. Typically, ridges generally appear lighter in the first image, while valleys generally appear darker in the first image. Then, a classification method can be used, such as for example the Otsu method, for calculating a threshold separating these two classes so that their intra-class variance is minimum. Advantageously a local version of the Otsu method is used. Other methods, especially based on their respective optical properties, can be employed to differentiate each of the regions of ridges and the regions of valleys.

Discriminating the zones of an image of a fingerprint relative to the valleys of those relative to the ridges reveals possible biases linked to the quality of the optical contact between the part of the human body observed and the surface 3. In fact, the representations in the images of ridges or valleys in contact with the surface 3 are affected variously by the state of the skin, and especially by its moisture.

For example, when a finger is moist or greasy, optical contact is favored as moisture or grease ensures good optical coupling. Inversely, when the finger is dry, coupling between the surface 3 and the part of the human body is not optimal. But for a very greasy or very moist finger the number of exploitable valley pixels can be too low. Also, zones relative to the ridges generally have a more intense level of signal, therefore better signal to noise ratio.

Consequently, the features which can be revealed vary according to whether the zones of an image of a fingerprint relative to the valleys or relative to the ridges are exploited, and according to the conditions of acquisition of an image. Separate analysis for these two types of zones, or even for only one of these types is therefore preferably undertaken.

The second display pattern is intended to be displayed by the emissive screen 1 so as to light up the part of the human body in contact with the surface 3 when the imager 2 acquires the second image. To produce additional information relative to the first image, the second pattern is constructed to reveal, on the second image, characteristics useful to the biometric method and not immediately accessible in the first image. The second pattern can also cancel or attenuate the appearance in the second image of elements not useful to biometric processing, such as traces of dust, stain, or else regions of the human body not exploited by processing. In this way, the attempt can be made to have the representation of the second phalange of the finger in the second image disappear when the aim is only to exploit fingerprints present at the extremity of the finger.

Figure 1:
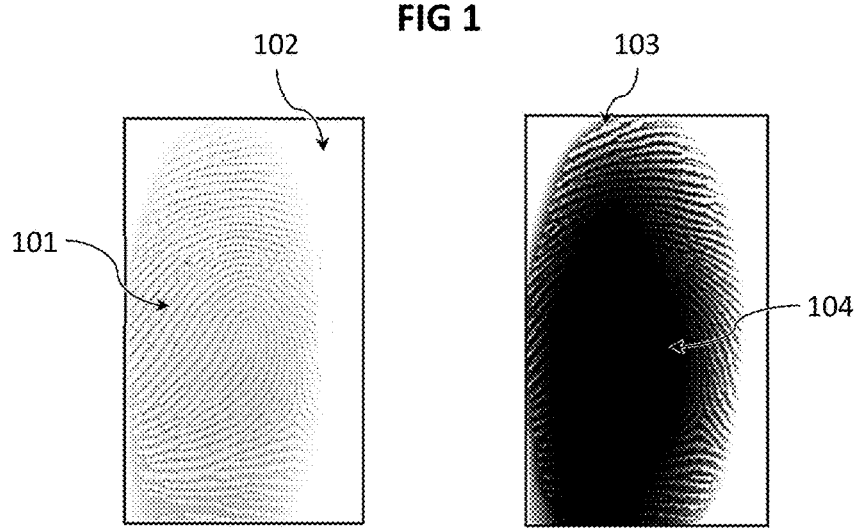

As explained earlier in reference to FIG. 1, external light can cause a loss of information, especially at the center of the representation of a finger or at its periphery. In the same way, some zones of the part of the human body in contact with the surface 3 can exhibit variable qualities in optical coupling with said surface 3, for example because they have different states (moisture, cleanliness), or by difference in pressure. So when several fingers are placed on the surface 3 they will rarely have the same optical coupling.

Figure 3A:
FIGS. 3a, 3b and 3c illustrate schematically examples respectively of a first image, a second pattern, and a second image according to a possible embodiment of the invention.

The second pattern can therefore be determined from the first image to improve the quality and exploitability of the second image relative to the first image. FIG. 3a shows an example of a first image, illustrating four fingers lit by a first uniform display pattern. The ellipses 31 indicate the locations of the representation of the part of the human body in the first image. The ellipses 31 thus enclose the representations of the last phalange of each of the four fingers, and more precisely their pulp, i.e., the fleshy extremity of their internal face, the skin of which is on the fingerprints.

In this first image, the extremities of the four fingers do not appear identically. The extremity 32 of the finger farthest to the right appears more luminous than the extremity 33 of the finger farthest to the left. Other elements appear, which cannot be exploited by biometric processing, and which can alter the biometric processing of the image. For example, the rest 34 of the fingers, i.e., the first two phalanges, can appear due to their proximity to the surface 3. Similarly, the zone 35 of the surface 3 in which the part of the human body presented to the sensor is absent can contain parasite elements such as stains, or else coming from an external light.

Figure 3B:

The second pattern can be determined to improve the image quality of exploitable zones of the imaged part of the human body, i.e., the zones located inside the ellipses 31 in the example, and minimize the influence of the other elements. FIG. 3b shows an example of a second pattern determined from the first image of FIG. 3a.

Determination of the second pattern comprises positioning lighting zones 42, 43 in the second pattern corresponding to the location of the representation 32, 33 of the part of the human body in the first image, such that the part of the human body in contact with the surface is lit by said lighting zones 42, 43 when the emissive screen 1 displays the second pattern. The second pattern can comprise at least one zone 45 of non-lighting corresponding to the exterior of the representation of the part of the human body in the first image. Similarly, the absence of lighting at the representation of parts of fingers not used in biometric processing in the first image is noted, i.e., at the representation 34 of the two first phalanges of the fingers imaged in FIG. 3a.

Preferably, the lighting zones 42, 43 are not uniform. In particular, they are adapted to correct the differences in quality noted on the first image. Therefore determination of the second pattern comprises determination of the spatial distribution of the light intensity in the first image, and the second pattern is determined from the inverse of said spatial distribution at least for the zone(s) corresponding to the representation of the part of the human body. In addition to inversion, other processing can be applied, such as thresholding, offsetting, or even application of a transformation function, for example a non-linear function of gamma type. It can be ensured for example to adapt the lighting intensity, especially to obtain a sufficient signal for pigmented fingers.

In the example of FIG. 3b, the lighting zones 42, 43 present an inverse luminous distribution relative to the first image of FIG. 3a, sampled in four levels of intensity. Corresponding to the zone 32 of the representation of the most luminous finger extremity in FIG. 3a, the zone 42 is the darkest of the four lighting zones of FIG. 3b. Inversely, corresponding to the zone 33 of the representation of the least luminous finger extremity in FIG. 3a, the zone 43 is the darkest of the four lighting zones of FIG. 3b.

As the human body is rather scattering, the first image can be simplified for example by blurring or sub-sampling, prior to determining the second pattern by inversion, especially to erase any useless irregularity, without altering the effects produced by lighting of the finger. In the event where the method described were to be repeated several times, the second pattern could be determined not only from the first image, but also from the second patterns determined previously for the same part of the human body, to accelerate getting the preferred result.

As lighting zones, the second pattern can also comprise luminous geometric figures distinct and separate. In this way, determination of the second pattern can comprise determination of the geometric figures to be displayed (type, color, . . . ) and their location in the second pattern.

Determination of the second pattern can comprise analysis of the first image to locate the representation of at least one finger in the first image, and the distinct and separate geometric figures of the second pattern are located in the second display pattern at a zone of said representation of said finger in the first image, such that the geometric figures are displayed by the emissive screen 1 opposite said finger.

More than simple location of the representation of a finger, analysis of the first image can comprise location in the representation of the part of the human body in the first image of a region representative of a particular visual feature of said part of the human body. The zone in which the geometric figures of the second pattern are located can correspond to this region representative of a particular visual feature of said part of the human body, such that the geometric figures are displayed by the emissive screen 1 facing said region representative of a particular visual feature of said part of the human body.

Geometric figure means a form which can be described by a geometric object of base such as a set of two or more points, a line, a curve, a planar figure, for example a square or a circle, or else a form defined by a function such as a sinusoid. In terms of the method, a geometric figure has clear and sufficiently regular contours so it is possible to calculate simply the distance of any point relative to this geometric figure. Also, these geometric figures can cover only part of the second pattern corresponding to the representation of the finger in the first image, for example less than 50%, or even less than 20%, and again, can cover a small part only of the second pattern, for example less than 15%, or even less than 5%.

The geometric figures can be isotropic or anisotropic, comprising isolated elements or sites of elements, and can vary according to different characteristics such as periodicity, their extent, etc.

Figure 5:
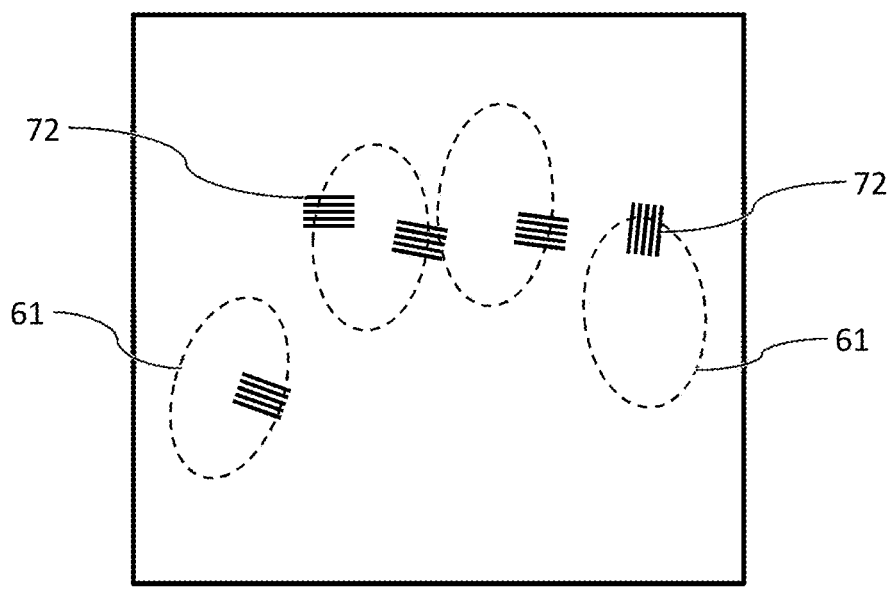

FIG. 5 illustrates such an embodiment, with a second pattern comprising geometric figures, constructed from the first image of FIG. 3a, wherein the ellipses 31 indicate the locations of the representation of the part of the human body in the first image. The ellipses 31 enclose the representations of the last phalange of each of the four fingers, and more precisely their pulp, i.e., the fleshy extremity of their internal face, the skin of which is on the fingerprints.

Figure 4:
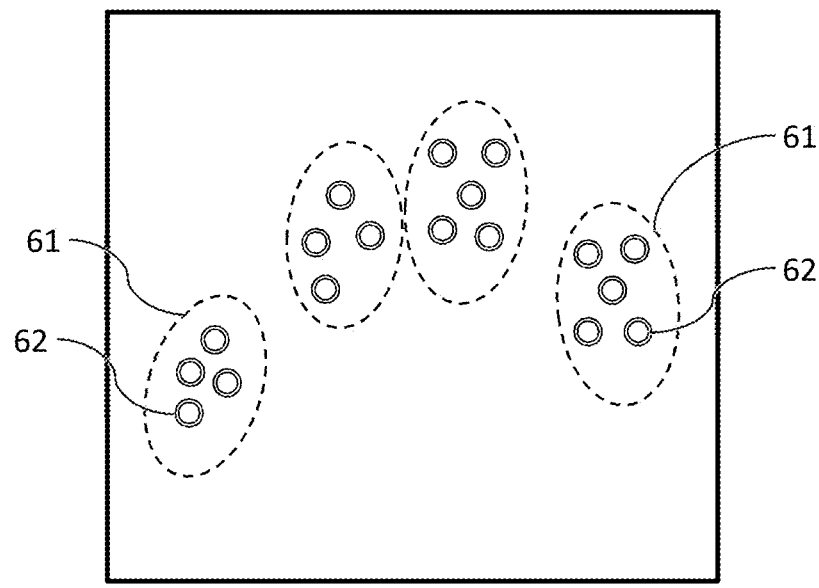
FIGS. 4 and 5 illustrate schematically examples of second patterns according to possible embodiments of the invention.

FIG. 4 therefore schematically shows an example of a second display pattern comprising geometric figures, wherein said geometric figures are luminous points 62. For legibility reasons, these are represented by double circles at the contours. FIG. 4 shows also in dots ellipses 61 positioned in placements corresponding to the ellipses 31 indicating the locations of the representation of the part of the human body in the first image on FIG. 3a. These ellipses 61 do not form part of the second pattern, and their presence serves only to illustrate the location of points 62 inside a zone corresponding to the representation of fingers in the first image, i.e., inside the ellipses 31 of FIG. 3a. These ellipses 61 will therefore be considered hereinbelow as their interior, i.e., as the zones of the second pattern corresponding (spatially) to the representation of the finger in the first image.

As in the illustrated example, geometric figures such as points 62 are arranged randomly in the zones 61 of the second pattern corresponding to the representation of the finger in the first image. The arrangement can vary by location of the geometric figures and/or by their orientations. Here, random means the characteristic according to which the arrangement of geometric figures has no determinable arrangement a priori or a posteriori, and in particular has no symmetry. The arrangement can for example be random in the location of the geometric figures or in their orientation. Due to this, attempts at fraud are more difficult to carry out, since frauds cannot know in advance the arrangement of these geometric figures in the second pattern. This also avoids frauds by replay consisting of presenting the sensor with an image similar to the preceding transaction.

Preferably, the arrangement of geometric figures responds to set of constraints. In particular, the geometric figures of the second pattern are spaced apart by at least 2 mm, and preferably by at least 4 mm, or even 6 mm. Similarly, the geometric figures are spaced by at least 3 mm relative to the edges of the zones 61. It should be noted that for legibility reasons, scale is not respected in the different figures, and for example the points 61 typically have a diameter of less than 1 mm.

Spacing of the geometric figures ensures that scattering of light by the skin of projection of a geometric figure does not interfere significantly with the projection of another distinct geometric figure. Preferably, the aim is to maximize the number of geometric figures in each zone 61. Since the configuration of the positioning of the part of the human body in the field of the imager 2 is known from the first image, the number of figures per finger can be maximized and the number of necessary images can be limited.

An optimization algorithm performed by the automated data-processing system can find an arrangement responding to these constraints, and preferably adding a random component.

It can also be provided to move the geometric figures away from zones corresponding to singularities detected in the first image, which can correspond to dust, cuts, wrinkles, or patches, which could disrupt later analysis. Similarly, these geometric figures can be moved away from the edge of the finger to improve measuring precision.

FIG. 5 schematically illustrates another example of second display pattern comprising geometric figures, wherein said geometric figures are sets of parallel lines 72. These are shown as black lines, but correspond in reality to luminous lines. The parallel lines 72 belong to a set of figures which can be qualified as anisotropic. Also these are figures which present spatial periodicity, in this case the periodicity of the repetition of lines. It should be noted that the lines could also be curves. Similarly, sets of five lines are shown, but their number could be different. A set comprises however at least two elements, such as two parallel lines.

This second pattern is also determined from the first image illustrated by FIG. 3a. As in FIG. 4, the ellipses 61 do not form part of the second pattern, and their presence serves only to illustrate the contours of zones corresponding to the representation of fingers in the first image.

The parallel lines 72 are positioned so as to cut the contours of zones corresponding to the representation of fingers in the first image, i.e., the ellipses 61. More precisely, the parallel lines 72 are perpendicular to the latter. As will become evident, this arrangement of parallel lines 72 is particularly advantageous as it dispenses with inhomogeneity of the finger near edges of the zone in contact with the surface 3 by allowing analysis in a direction parallel to the contours identified.

It is understood that the different techniques mentioned here are non-limiting examples, and that other techniques can be employed. In particular, it is possible to combine techniques together. So, a second pattern can for example comprise both points 62 and parallel lines 72.

In particular, different geometric figures can be used for the center of zones 61 and for their peripheries. For example, isotropic geometric figures such as the points 62 can be used for the center of the finger, and anisotropic geometric figures for the periphery, such as the parallel lines 72, so that irregularities in contours do not disrupt later analysis. Similarly, if a cutaneous characteristic such as a scar or wrinkle has been detected on the first image, an anisotropic geometric figure can also be used at this location.

Also, it is naturally possible to not simultaneously display the same pattern or the same combination of patterns in different zones corresponding to the representation of different fingers in the first image.

Similarly, a second pattern at the same time can comprise geometric figures and lighting zones determined from the inverse of spatial distribution of light intensity in the first image. Also, several different second patterns can be determined from the same first image.

A second pattern is constituted by colored zones. The same second pattern can have several colors. Whenever this is the case, the second pattern preferably has distinct colors, for example with dominant wavelengths separated by at least 40 nm. More preferably, the wavelengths of colors are on either side of 600 nm, with for example green and red. The use of different colors builds on the differences in response of the human skin as a function of wavelengths.

Similarly for forms of geometric figures, colors can be selected as a function of the location of the latter in the zones of the second pattern corresponding to the representation of the finger in the first image. The fact that the whitening of the finger is generally more pronounced at the center than at the periphery of the contact zone with the surface 3 can for example be considered, and therefore absorption of green or blue light, mainly linked to hemoglobin, is modified.

Similarly, when several second patterns are determined, one of said second patterns is preferably constituted by colors in wavelengths less than 600 nm and another of said second patterns is constituted by colors in wavelengths greater than 600 nm. For example, a second pattern can comprise points 62 of green color, and another pattern of the parallel lines 72 of red color. The geometric figures can however vary in form and color. Similarly for their arrangement, the wavelengths of geometric figures can vary randomly, with for example unforeseeable alternations of several wavelengths.

The second pattern can also comprise lighting zones or figures outside zones 61 corresponding to the representation of the finger identified in the first image. In fact, it is possible that some zones cannot be clearly determined as belonging or not to the representation of the finger. This can be the case for pollution of the surface 3 of the sensor by contact of fingers with droplets or dead cells, or by scratches, condensation or dust. There can be artifacts resulting from these perturbations in the first image.

To ensure that this is only about artifacts and not an unidentified part of the representation of the finger, it can be provided that the second pattern, apart from the lighting zones or figures in the zones 61 corresponding to the representation of the finger identified in the first image, comprises lighting zones or figures outside these zones 61. During analysis this then raises doubt as to the nature of these doubtful zones. The location, form and color of figures employed can be adapted to this aim. Especially, a lit zone adjacent to the doubtful zone can be provided in the second pattern.

For example, in case of suspicion of a trace, the color red can be used in a figure adjacent to the location of the suspected trace. If this is a part of the human body, the skin covering the latter will scatter red light and the site of the suspected trace will be luminous in the image acquired. However, if this is a trace, there will be no scattering, and the site of the suspected trace will not be luminous in the image acquired.

Display of the Second Pattern

The second determined pattern is displayed by the emissive screen 1, lighting the part of the human body on contact with the surface 3.

When the second pattern has been determined from the inverse of the spatial distribution of light intensity in the first image, the lighting of the finger corresponds to this inversion. In this way, the zones which appeared the lightest in the first image, such as the extremity 32 of the finger farthest to the right in FIG. 3a, are lit by lighting zones 42 less luminous than the lighting zones 43 lighting the zones which appeared darker in the first image, such as the extremity 33 of the finger farthest to the left in FIG. 3a.

The zones where the part of the human body is not in contact with the surface 3 correspond to the lighting absence zones 44, 45. Lighting of the imaged part of the human body is concentrated on the zones to be exploited. The risk of revealing in the images of elements alien to the part of the human body to be imaged is also limited, such as traces or scratches on the surface 3.

When the second pattern comprises luminous geometric FIGS. 62, 72 arranged in the second pattern in zones 61 corresponding to the location of the representation of the part of the human body in the first image, these geometric figures are projected onto the zones of the part of the human body opposite said geometric FIGS. 62, 72.

Acquisition of the Second Image

Whereas the part of the human body is lit by the second pattern displayed by the emissive screen 1, the imager 2 acquires a second image of the lit part of the human body. Due to the change in display pattern between acquisition of the first image and acquisition of the second image, and therefore of the lighting of the part of the imaged human body, the second image is different to the first image.

Figure 3C:

FIG. 3c shows an example of a second image obtained after lighting by the second display pattern illustrated by FIG. 3b, determined from the first image illustrated by FIG. 3a.

It is evident that the extremity 52 of the finger farthest to the right appears with light intensity similar to that of the extremity 53 of the finger farthest to the left, in contrast to the first image illustrated by FIG. 3a. Also, each extremity of the fingers 52, 53 has more uniform light intensity. The exploitability of the representation of the part of the human body in the second image is therefore improved relative to that of the first image.

Also, the rest 54 of the fingers, i.e., the two first phalanges, are less visible in the second image relative to the rest 34 in the first image, since it has not been lit by the second pattern. These elements are therefore less likely to disrupt later analysis of the second image.

Similarly, the zone 55 of the second image corresponding to the absence of the part of the human body, not being lit by the second pattern, is less likely to reveal parasite elements such as stains.

FIGS. 6a, 6b and 6c show an example of implementation of the second pattern similar to that illustrated by FIG. 4, in detailing an extremity of a finger. FIG. 6a shows the detail of the representation 64 of this extremity of the finger in a first image. The second pattern determined from this first image is illustrated by FIG. 6b and comprises luminous geometric figures constituted by points 62, arranged facing the representation 64 of the extremity of the finger. FIG. 6c shows a detail of the resulting second image. This second image comprises lit zones 65 corresponding to the projections on the part of the imaged body of the points 63 of the second pattern.

Figure 7A:
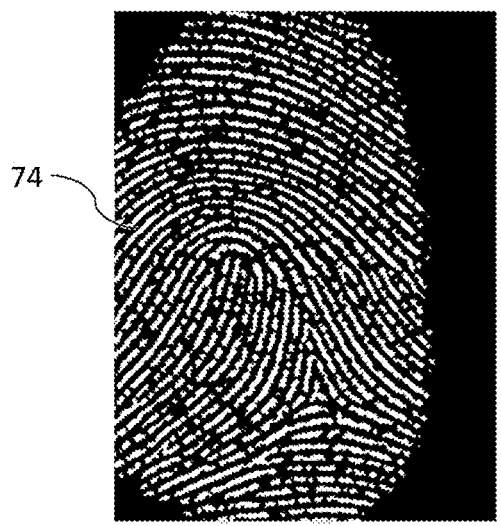
FIGS. 7a, 7b and 7c illustrate an example of implementation of the embodiment of FIG. 5.
Figure 7B:
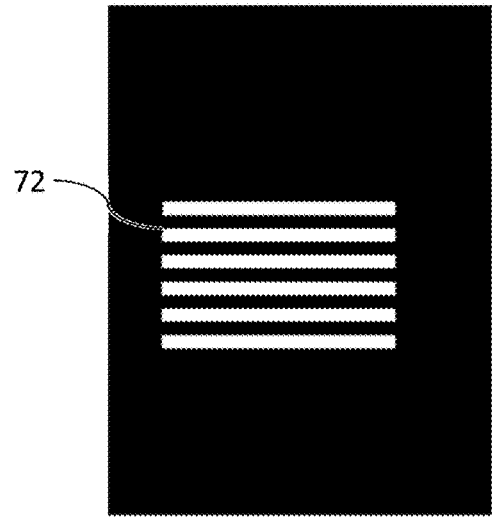
Figure 7C:
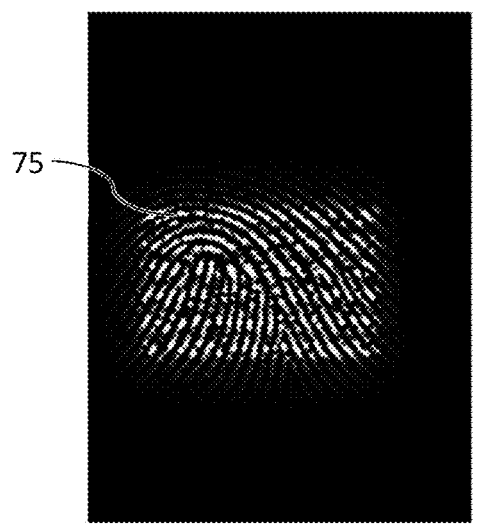

FIGS. 7a, 7b and 7c show an example of implementation of the second pattern similar to that illustrated by FIG. 5, in detailing an extremity of a finger. FIG. 7a shows the detail of the representation 74 of this extremity of the finger in a first image. The second pattern determined from this first image is illustrated by FIG. 7b and comprises luminous geometric figures constituted by a set of parallel lines 72, arranged facing the representation 64 of the extremity of the finger. FIG. 7c shows a detail of the resulting second image. This second image comprises lit zones 75 corresponding to projections on the imaged part of the body of the set of parallel lines 72 of the second pattern.

Since the second pattern has been determined from the first image, figures are found in the second image with positioning corresponding precisely to what is expected. The precision obtained by this projection finely adapts the second pattern to the site where it is projected, i.e., the fingers.

Preferably, acquisition of the first image and of the second image is completed in a time interval of less than 1 s, preferably fewer than 500 ms, and more preferably fewer than 200 ms. The limitation of time between acquisition of the first image and acquisition of the second image avoids any displacement of the part of the human body on contact with the surface 3, or a change in conditions of acquisition such as external light.

It is clear that the steps of the method can be iterated, by determining a display pattern from the second image, such that a second pattern of an iteration can become the first pattern of a following iteration, and the second image of an iteration can become the first image of a following iteration. Similarly, it is clear that the method can determine a series of second patterns different to the same first image and can acquire the series of corresponding second images. The second patterns can for example differ by lighting in a given location of a point of several colors, lines of several frequencies, sinus of several phases . . . .

For example, during a first iteration a second pattern can be determined from the inverse of spatial distribution of light intensity in a first image to homogenize light intensity in the second image. From this second image a display pattern can be determined, for example comprising geometric figures, which, displayed by the emissive screen 1, light up part of the human body during acquisition of a following image.

The second pattern determined from the inverse of spatial distribution of light intensity can be considered as a first pattern, the image acquired during lighting of the finger by the latter as a first image, and the display pattern with geometric figures as a second pattern and the following image as a second image.

Iteration of the method can advantageously be used when the result of analysis of the second image fails to achieve the desired aim. A second pattern can be determined by taking into account the result of analysis of the second image, and a second image can be acquired. For example, for a second pattern comprising geometric figures in the form of a set of parallel red lines with a given spatial period, for example 0.5 mm, if the biometric processing does not arrive at the expected results, another second pattern comprising geometric figures in the form of a set of blue parallel lines with the same spatial period or a different period could be used, for example 1 mm.

Also, characteristics of the second pattern can be conducive to revealing the nature of any artifacts in the first image, as explained above. The second image raises doubt on the fact that a region corresponds to the representation of the finger or to an artifact. Another second pattern can be determined by taking into account the identification of these artifacts, with for example a best delimited region of interest.

In determining a display pattern from the second image, the characteristics of said display pattern can best be determined to eliminate the insufficiencies of the display patterns or complete them, in particular by changing colors. In this way, if a part of the human body has particularly low or high reflectivity in a color, a pattern of another color can be then used to confirm that the noted reflectivity comes from a characteristic of the skin such as its melanin rate, or else is the result of fraud.

The form of the figures of the second pattern can also be modified. For example, for a second pattern comprising figures in the form of a set of parallel lines with a given spatial period, the periodicity of the parallel lines could be modified as a function of the results of analysis of the second image.

Iteration can also be advantageously applied to have the characteristics of the acquired images converge towards a preferred result. For example, by successively determining second patterns from the inverse of the spatial distribution of light intensity in images acquired to homogenize light intensity in the second images, the characteristics of the acquired images are improved each time. By iterating the method several times, a relatively high level of requirement can be achieved.

Execution of Biometric Processing

Biometric processing is performed on a final image constructed from at least the second image. Biometric processing can be performed by the automated data-processing system which has determined the second display pattern, or by another automated data-processing system.

The final image can typically be the second image, but can also be constructed from two second images, for example by their combination, or else from the first image and the second image, for example by their combination.

Biometric processing can comprise execution of a method of identification from biometric characteristics drawn from the final image, typically from fingerprints. Extracted from the final image are elements of representations likely to correspond to characteristics utilizable for recognizing fingerprints, for example sites of convergence or divergence of ridges or valleys, or minutiae, points of irregularity located on the papillary lines such as terminations or bifurcations. Other biometric characteristics can however be used for identification, especially in their combination, such as for examples the positions of pores, the form of edges of ridges.

Biometric processing can comprise performing a method for fraud detection aimed at determining that the imaged part of the human body is authentic and not a fraud.

In particular, the representations in the second image of projections of the geometric figures of the second pattern on the skin can be specially adapted to this usage, such as for example the projections of points in FIG. 6c or the projections of parallel lines in FIG. 7c.

Biometric processing can especially comprise analysis in the final image of the decrease in light intensity from sites of the second image corresponding to zones of the part of the human body lit by said geometric figures.

In fact, the human skin has characteristics of absorption and light scattering which are specific to it, and which are difficult to counterfeit exactly. Also, these characteristics depending on wavelength, use of several wavelengths equally increases the possibilities of detection.

Figure 8:
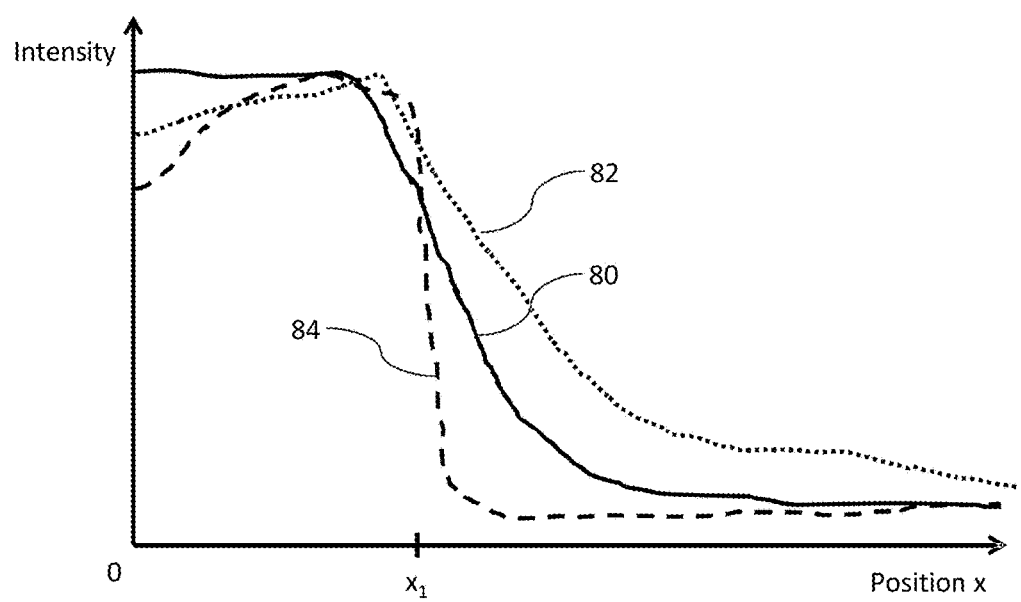
FIG. 8 illustrates schematically examples of curves of light intensity of points of the second image as a function of the position of said points according to a possible embodiment of the invention.

FIG. 8 shows examples of profiles of decrease in this light intensity as a function of the position, said position constituting the abscissa along a straight line moving away from the projection of the figure. Three curves are shown. The first curve 80 corresponds to a profile of decrease in light intensity for human skin, and therefore for an authentic finger. The second curve 82 corresponds to a profile of decrease in light intensity for gelatin or translucent silicone, therefore a first type of fraud. Finally, the third curve 84 corresponds to a profile of decrease in light intensity for modeling paste or white silicone, therefore a second type of fraud.

A first part constituted by the positions of 0 to $x_1$ corresponds to the presence of the projection of the figure in the final image, whereof the edge is located at position $x_1$. Some irregularities are present in this first part, for the different curves 80, 82, 84. These irregularities are essentially due to the imprecision of edges of the different objects presented to the sensor, but also to the different characteristics of the materials, for example in terms of reflexivity. In this way, this first part is not ideal for the conducting detection.

The second part, commencing from $x_1$, corresponds to light intensity outside the projection of the figure in the final image, and considers scattering and absorption of light from the projected figure. The decreasing forms of curves 80, 82, 84 are richer in terms of own characteristics (slope, inflection, distances, etc.) in the first part. This second part is therefore the preferred part for detecting frauds.

As is clear in FIG. 8, relative to the profile of decrease shown by the curve 80 of an authentic finger, the other profiles of decrease shown by curves 82, 84 differ therefrom by several aspects.

These differences can be revealed if different ways. can for example directly compare the values taken by the profile of decrease extracted from the final image analyzed with a database of profiles of decrease considered as authentic, by determining a similarity criterion, for example by the method of least squares. In this way, a profile of decrease whereof the similarity criterion would be too far removed from a tolerated variation interval would be considered as representative of the non-authentic character of the part of the imaged body. In a similar way, a database of profiles of decrease considered as frauds could also be used.

Another way is to extract characteristics from the profile of decrease, and compare them to ranges of values deemed acceptable for an authentic skin. A gradient value of the decrease at a given site can for example be determined, or for example a point of inflection or any other pertinent characteristic can be determined. Of course, and preferably, several techniques can be combined together.

More complex indices for valuing these differences can also be constructed. An example of such an index is a modulation index, constructed from a ratio using the maximum intensity and the minimum intensity found over a given distance. Such an index is advantageously used with periodic geometric figures, such as the parallel lines 72 of FIG. 5 or sinusoids. By scanning the second image perpendicularly to the parallel lines 72, a modulation index for each interval between the lines can be determined. Frauds can be detected by comparing the values of these indices with thresholds.

Other methods exploiting the decrease in light intensity can be used, for example by using more evolved methods such as Fourier transformations.

Once again, the method can be iterated by determining new second patterns of illumination and controlling the validity of the resulting acquisition. It is interesting in particular to adapt the intensity of the lighting to obtain a sufficient signal of profile of decrease or any other fraud detection for pigmented fingers.

A prior acquisition step of a database of characteristics specific to authentic human skin can be necessary. The different thresholds or values used to detect frauds can be determined empirically by means of testing a bank of authentic samples and fraud.

In this way, by studying in the final image the spatial decrease in light intensity corresponding to the projection of a figure onto the skin, and comparing the latter or criterion derived from the latter to reference data, the authenticity or not of the part of a presented human body can be determined.

The invention is not limited to the embodiment described and illustrated in the appended figures. Modifications are possible, especially from the point of view of the constitution of various technical characteristics or by substitution of technical equivalents, without as such departing from the scope of protection of the invention.

The invention claimed is:

1. A method for biometric processing of images of part of the human body having papillary ridges for determining whether an imaged part of the human body is authentic for the detection of fraud, said method comprising:
    acquiring images of part of the human body having papillary ridges on contact with a surface of a sensor adapted to receive in contact a part of the human body to be imaged, said sensor comprising an automated data-processing system, an emissive screen comprising an array of individually controllable pixels, the states of the pixels defining a display pattern of the emissive screen, and a substrate on which are disposed elements sensitive to light constituting an imager and sharing the orientation of the emissive screen,
    wherein the acquiring images further comprises:
        displaying, by the emissive screen of the sensor, at least one first display pattern to light said part of the human body, the emissive screen being configured to light said part of the human body to be imaged when said part of the human body is in contact with the surface, and acquiring at least one first image of said part of the human body by the imager;
        determining, from this first image, by the automated data-processing system, at least one second display pattern different to the first display pattern, wherein the determination of the second display pattern comprises analysis of the first image to locate a representation of the part of the human body in said first image, and wherein determination of the second display pattern comprises positioning of lighting zones in the second display pattern corresponding to the location of the representation of the part of the human body in the first image, such that the part of the human body in contact with the surface is lit by said lighting zones when the emissive screen displays the second display pattern, the second display pattern comprising luminous geometric figures which are distinct and separate defined by the states of the pixels of the emissive screen; and displaying, by the emissive screen, at least the second display pattern to light said part of the human body so that said part of the human body in contact with the surface is illuminated by said lighting zones when the emissive screen displays the second display pattern, and acquiring at least one second image of said part of the human body by the imager, and performing, by the automated data-processing system, biometric processing on a final image constructed from at least the second image, said biometric processing comprising performing a method for fraud detection aimed at determining that the imaged part of the human body is authentic and not a fraud using representations in the second image of projections of the luminous geometric figures of the second display pattern.

2. The method according to claim 1, wherein biometric processing of the final image constructed from at least the second image comprises a step for detecting, among the pixels of said second image, the pixels corresponding to papillary ridges.

3. The method according to claim 1, wherein determination of the second display pattern comprises determination of the spatial distribution of the light intensity in the first image, and the second display pattern is determined from the inverse of said spatial distribution.

4. The method according to claim 1, wherein biometric processing comprises analysis in the final image of the decrease in light intensity from sites of the second image corresponding to the projections of said geometric figures on the part of the human body lit by the second display pattern displayed by the emissive screen.

5. The method according to claim 1, wherein determination of the second display pattern comprises analysis of the first image to locate the at least partial representation of the part of the human body in the first image, and the geometric figures of the second display pattern are located in the second display pattern at a zone corresponding to said representation of the part of the human body in the first image, such that the geometric figures are displayed by the emissive screen facing the part of the human body.

6. The method according to claim 5, wherein analysis of the first image comprises location in the representation of the part of the human body in the first image of a region representative of a particular visual feature of said part of the human body, and the zone in which are located the geometric figures of the second display pattern corresponds to said region representative of a particular visual feature of said part of the human body, such that the geometric figures are displayed by the emissive screen facing said region representative of a particular visual feature of said part of the human body.

7. The method according to claim 1, wherein the geometric figures of the second display pattern are spaced apart by at least 2 mm and are arranged randomly.

8. The method according to claim 1, wherein several second display patterns are determined from the first image, and, successively for at least several of said second display patterns, the emissive screen displays at least one of said second display patterns to light said part of the human body and the imager acquires at least one second image of said part of the human body.

9. The method according to claim 8, wherein at least one of said second display patterns is constituted by colors in wavelengths less than 600 nm and another of said second display patterns is constituted by colors in wavelengths greater than 600 nm.

10. A non-transitory computer-readable memory comprising program code instructions stored thereon, said instructions when executed by a computer, causing the computer to perform a method comprising the steps of:

acquiring images of part of a human body having papillary ridges on contact with a surface of a sensor adapted to receive in contact a part of the human body to be imaged, said sensor comprising an automated data-processing system, an emissive screen comprising an array of individually controllable pixels, the states of the pixels defining a display pattern of the emissive screen, and a substrate on which are disposed elements sensitive to light constituting an imager and sharing the orientation of the emissive screen, wherein the acquiring images further comprises:

displaying, by the emissive screen of the sensor, at least one first display pattern to light said part of the human body, the emissive screen being configured to light said part of the human body to be imaged when said part of the human body is in contact with the surface, and acquiring at least one first image of said part of the human body by the imager;

determining, from this first image, by the automated data-processing system, at least one second display pattern different to the first display pattern, wherein the determination of the second display pattern comprises analysis of the first image to locate a representation of the part of the human body in said first image, and wherein determination of the second display pattern comprises positioning of lighting zones in the second display pattern corresponding to the location of the representation of the part of the human body in the first image, such that the part of the human body in contact with the surface is lit by said lighting zones when the emissive screen displays the second display pattern, the second display pattern comprising luminous geometric figures which are distinct and separate defined by the states of the pixels of the emissive screen; and displaying, by the emissive screen, at least the second display pattern to light said part of the human body so that said part of the human body in contact with the surface is illuminated by said lighting zones when the emissive screen displays the second display pattern, and acquiring at least one second image of said part of the human body by the imager, and performing, by the automated data-processing system, biometric processing on a final image constructed from at least the second image, said biometric processing comprising performing a method for fraud detection aimed at determining that the imaged part of the human body is authentic and not a fraud using representations in the second image of projections of the luminous geometric figures of the second display pattern.

11. A sensor configured to perform biometric processing, said sensor comprising:
- an automated data-processing system;
- an emissive screen comprising an array of individually controllable pixels, the state of the pixels defining a display pattern of the emissive screen; and
- a substrate on which are disposed elements sensitive to light constituting an imager and sharing the orientation of the emissive screen,
- wherein said sensor comprises a surface adapted to receive in contact a part of a human body to be imaged, said emissive screen being configured to light said part of the human body to be imaged when said part of the human body is in contact with the surface,
- said sensor configured to perform a method comprising:
  - acquiring images of part of the human body having papillary ridges on contact with the surface,
  - wherein the acquiring images further comprises:
    - displaying, by the emissive screen of the sensor, at least one first display pattern to light said part of the human body, and acquiring at least one first image of said part of the human body by the imager;
    - determining, from this first image, by the automated data-processing system, at least one second display pattern different to the first display pattern, wherein the determination of the second display pattern comprises analysis of the first image to locate a representation of the part of the human body in said first image, and wherein determination of the second display pattern comprises positioning of lighting zones in the second display pattern corresponding to the location of the representation of the part of the human body in the first image, such that the part of the human body in contact with the surface is lit by said lighting zones when the emissive screen displays the second display pattern, the second display pattern comprising luminous geometric figures which are distinct and separate defined by the states of the pixels of the emissive screen; and
    - displaying, by the emissive screen, at least the second display pattern to light said part of the human body so that said part of the human body in contact with the surface is illuminated by said lighting zones when the emissive screen displays the second display pattern, and acquiring at least one second image of said part of the human body by the imager, and performing, by the automated data-processing system, biometric
- processing on a final image constructed from at least the second image, said biometric processing comprising performing a method for fraud detection aimed at determining that the imaged part of the human body is authentic and not a fraud using representations in the second image of projections of the luminous geometric figures of the second display pattern.

* * * * *